(12) United States Patent  
Toillon (10) Patent No.: US 6,195,365 B1
(45) Date of Patent: Feb. 27, 2001

(54) PROCESS FOR COMMUNICATING OVER AN OPTICAL BUS SIMULTANEOUSLY SUPPORTING DIFFERENT BIT RATES

(75) Inventor: Patrice Toillon, Le Pecq (FR)

(73) Assignee: Sextant Avionique, Velizy Villacoublay (FR)

(*) Notice: Subject to any disclaimer, the term of this patent is extended or adjusted under 35 U.S.C. 154(b) by 0 days.

(21) Appl. No.: 09/000,499

(22) PCT Filed: Aug. 2, 1996

(86) PCT No.: PCT/FR96/01239

§ 371 Date: Feb. 9, 1998

§ 102(e) Date: Feb. 9, 1998

(87) PCT Pub. No.: WO97/06621

PCT Pub. Date: Feb. 20, 1997

(30) Foreign Application Priority Data

Aug. 8, 1995 (FR) .................................................. 95 09607

(51) Int. Cl.[7] ....................................................... H04J 3/16
(52) U.S. Cl. ............................................................... 370/468
(58) Field of Search ..................................... 370/468, 543, 370/538, 503, 445, 446, 352, 487, 489, 490, 493, 542, 437, 438, 439, 458, 463, 465

(56) References Cited

U.S. PATENT DOCUMENTS

| 5,077,732 | * | 12/1991 | Fischer et al. | 370/85.4 |
| 5,079,763 | * | 1/1992 | Chao et al. | 370/85.6 |
| 5,613,069 | * | 3/1997 | Walker | 395/200.15 |
| 5,784,597 | * | 7/1998 | Chiu et al. | 395/552 |
| 5,793,760 | * | 8/1998 | Chopping | 370/355 |
| 6,026,088 | * | 2/2000 | Rostoker et al. | 370/395 |

* cited by examiner

Primary Examiner—Chau Nguyen
Assistant Examiner—Enrique L. Santiago
(74) Attorney, Agent, or Firm—Oblon, Spivak, McClelland, Maier & Neustadt, P.C.

(57) ABSTRACT

A communication process is employed on an optical bus simultaneously supporting different bit rates. A single time-division multiplexing transmission protocol is used on the bus. All the equipment is listening to the bus permanently. The items of equipment which require to send information insert it into time windows defined by the item of equipment itself and as a function of the activity of the other items of equipment irrespective of the information bit rate for these items of equipment. Each item of receiver equipment detects the activity of the bus, acknowledges the type of bit rate and recreates the information intended for it.

25 Claims, 5 Drawing Sheets

PROCESS FOR COMMUNICATING OVER AN OPTICAL BUS SIMULTANEOUSLY SUPPORTING DIFFERENT BIT RATES

BACKGROUND OF THE INVENTION

1. Field of the Invention

The present invention relates to a process for communicating over a bus simultaneously supporting different bit rates.

2. Discussion of the Background

Multiplexed communication buses are beginning to be used in avionics, and optical versions of these buses are appearing. The ARINC 629 standard relates to such buses. Currently, the information bit rate on such a bus is standardized at 2 Mbits/s, it being the case that certain items of equipment attached to this bus cannot provide a higher bit rate.

However, given that an optical bus can support an information bit rate of much greater than 2 Mbits/s and that avionics equipment or items of equipment which are grouped together in the form of a local unit and are attached to this bus may also send and/or receive information at a bit rate higher than this value, it is possible to envisage that information may be dispatched simultaneously over the same bus at different bit rates.

SUMMARY OF THE INVENTION

The subject of the present invention is a process for communicating over a bus, in particular an optical bus, which is linked up to equipment operating in a send and/or receive mode at different maximum or optimal bit. The process enables information to be dispatched simultaneously over the bus at different bit rates.

The process according to the invention is characterized in that a single time-division multiplexing transmission protocol is used on the bus, in that all the equipment is listening to the bus permanently, in that the items of equipment which require to send information insert it into time windows defined by the item of equipment itself and as a function of the activity of the other items of equipment irrespective of the information bit rate for these items of equipment, and in that each item of receiver equipment detects the activity of the bus, acknowledges the type of bit rate and recreates the information intended for it.

BRIEF DESCRIPTION OF THE DRAWINGS

The present invention will be better understood on reading the detailed description of the embodiments, taken by way of non-limiting examples and illustrated by the appended drawing in which.

DISCUSSION OF THE PREFERRED EMBODIMENTS

The invention is described below with reference to an aircraft communication system, but is not exclusively limited to such an application, and may be employed in other diverse systems which contain several information sender and/or receiver items of equipment whose maximum or optimal bit rates differ and which are linked to an optical or electrical bus. Naturally, the bus linking the various items of equipment of the system is not necessarily a one-section bus but may be divided into several sections linking the various items of equipment to form a "star" architecture for example. In the examples described below, the only two bit rates envisaged are 2 and 8 Mbits/s, but other values of bit rates can naturally also be defined and the invention is of course not limited to two different bit rates but can be applied to a larger number of different bit rates.

Figure 1:
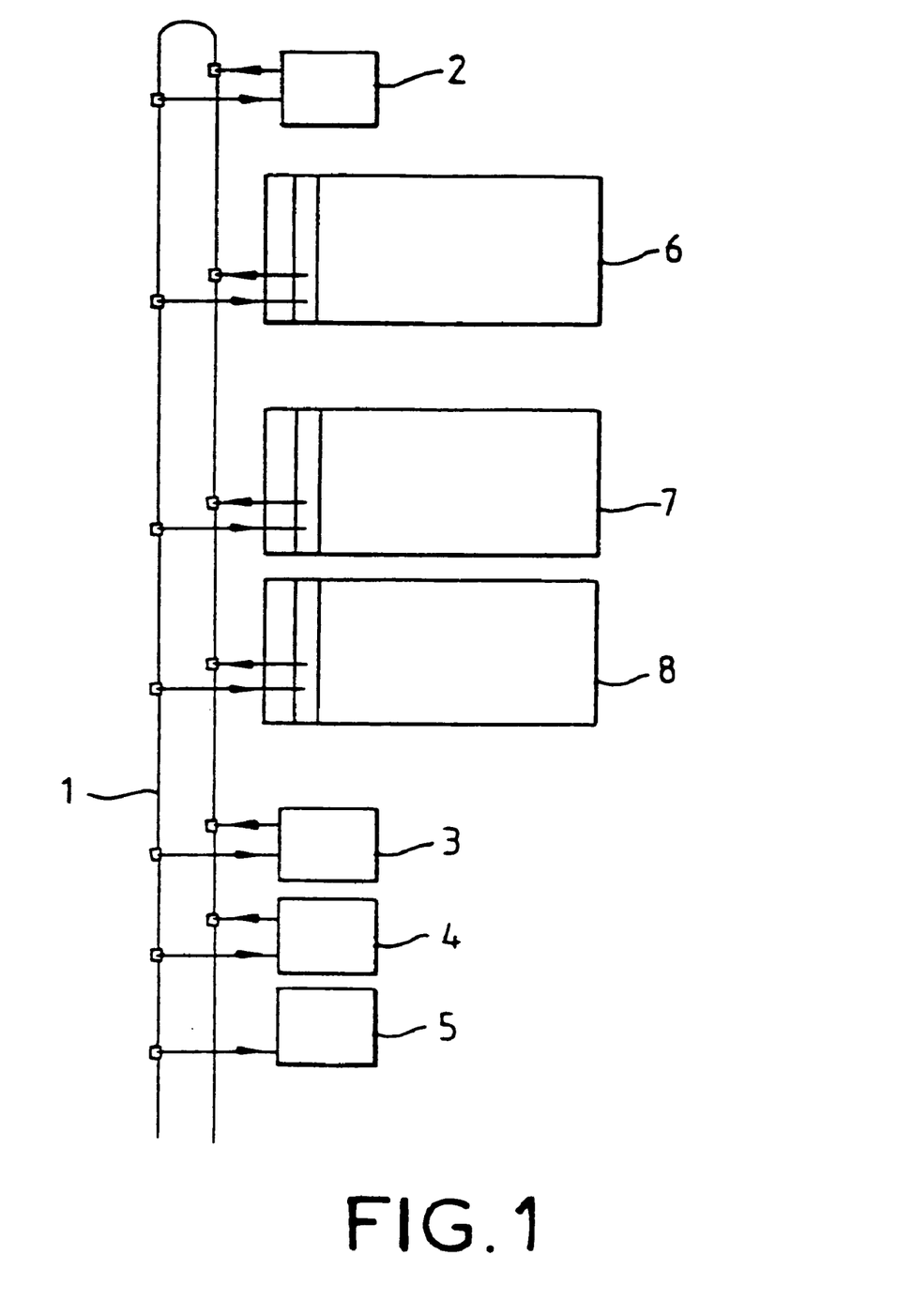
FIG. 1 is a partial block diagram of a single-fiber linear optical bus operating according to the process of the invention, with some of the equipment which is linked to it.

The system represented partially in FIG. 1 includes a fiber optic bus 1 to which diverse items of avionics equipment are linked. These items of equipment are, for example, simple elements such as sensors and actuators 2, 3, 4 and 5, a rack 6 which groups together several avionics modules (acquisition module, input/output module, computation and display module for example) in the form of a local unit, and complex equipment 7, 8 (for example HF sets, servocontrols, gateway equipment to other communication systems, etc.). Among the elements 2 to 5, the element 5 only has an information receiving function (for example a simple display device or an actuator). The information inputs and outputs of the aforesaid equipment are linked to the bus 1. For greater clarity in the drawing, the fiber 1 has been depicted as bent into a "U", one of the branches of which is linked to the outputs of the equipment, and the other branch of which is linked to their inputs, but this fiber can of course be straight or have any shape and the optical taps for connecting to the inputs and outputs of the equipment can, for each of these items of equipment, be placed close together or alternatively consist of a single bidirectional coupler.

Figure 2:
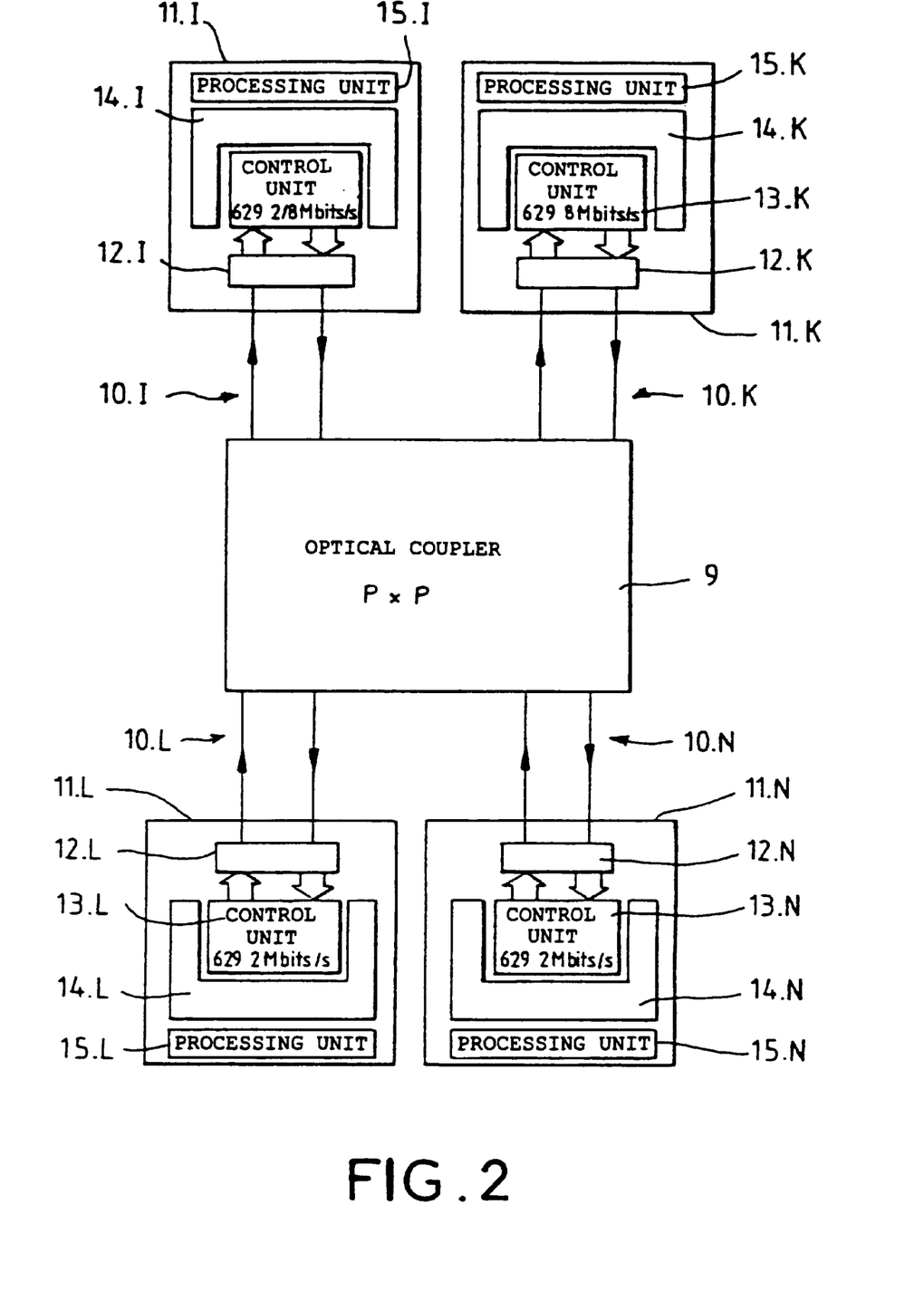
FIG. 2 is a partial block diagram of a star-configured avionics system operating according to the process of the invention.

The system depicted in FIG. 2 has a "star" structure. The common central part consists of an optical coupler 9 with P inputs and P outputs and from which there radiate N optical fibers 10.I to 10.N linking this coupler to the N different items of equipment 11.I to 11.N of the system, P being greater than or equal to N. The send and receive pathways in each of the sections joining the equipment to the coupler are strictly separated.

Each of the items of equipment represented in FIG. 2 (11.I, 11.K, 11.L and 11.N) is assumed to send and receive information. The interfaces of all these items of equipment can receive the information at 2 and 8 Mbits/s so as to be able to recognize that item or those items which may be suitable for their equipment. It is assumed that the items of equipment 11.L and 11.N send at one bit rate only, 2 Mbits/s, while the item of equipment 11.K sends at 8 Mbits/s and the item of equipment 11.I can send at one and/or the other of these two bit rates. Each of the items of equipment includes an optical/electrical serial interface, 12.I to 12.N respectively, matched to the bit rate to be sent. This interface is followed by a control unit 13.I to 13.N, and by customization environment and exchange circuits 14.I to 14.N respectively (in fact, the electronic and/or electrical circuits specific to each item of equipment). Various circuits of each item of equipment are managed by a processing unit, 15.I to 15.N respectively. Of course, the system can include other types of equipment constructed differently (reception only, no processing unit for rudimentary equipment such as sensors, converters, indicator lights, etc.).

Figure 3:
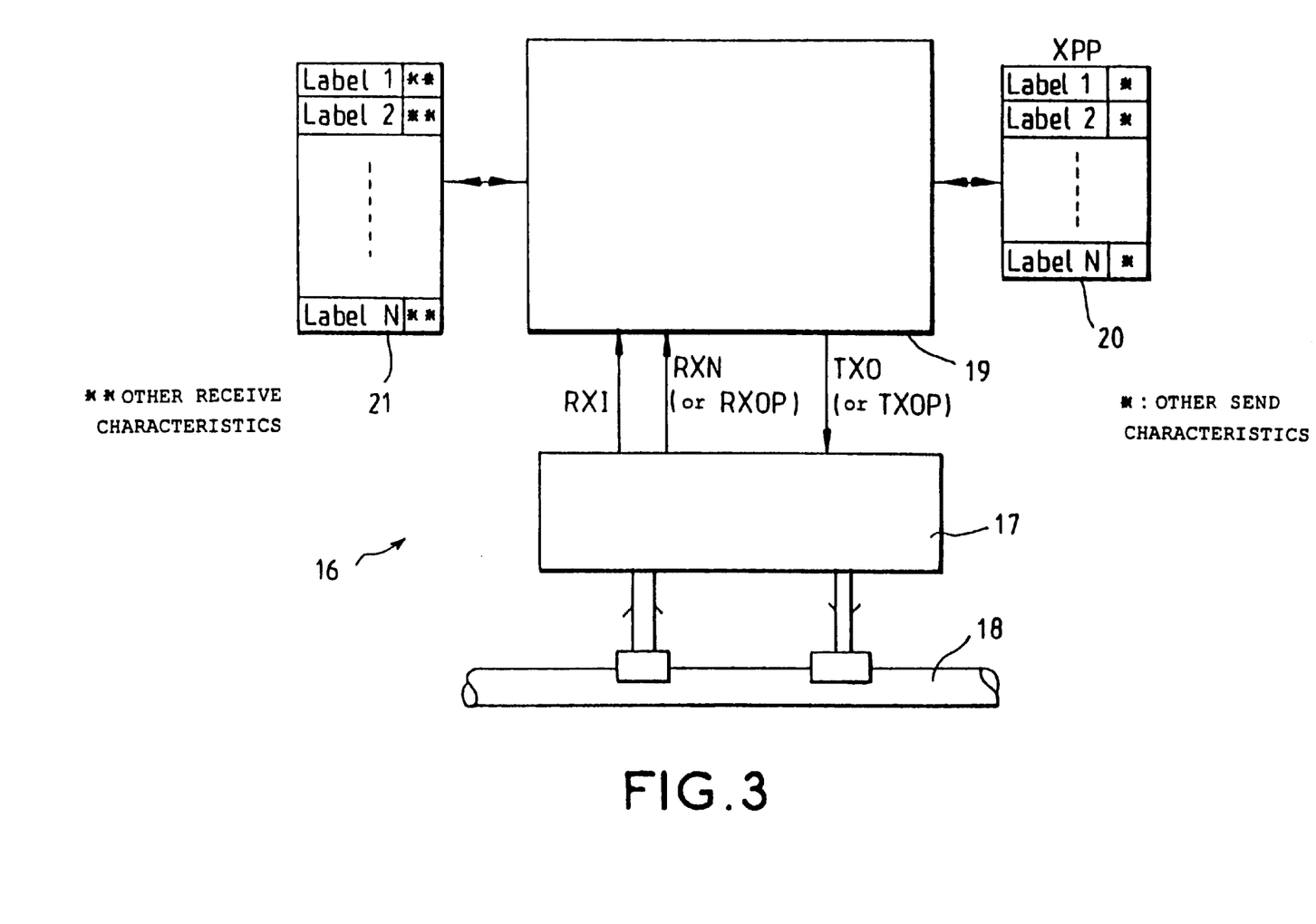
FIG. 3 is a simplified block diagram of an interface between an item of equipment and a bus operating according to the process of the invention.

FIG. 3 represents one possible embodiment of an optical/electronic interface 16 which can be used in the equipment of FIGS. 1 and 2. The interface 16 essentially comprises an optical/electronic converter 17 coupled to the optical bus 18, the electrical input and output of the converter 17 being linked to a unit 19 for controlling and managing the communications. The converter 17 constitutes the main active element of the physical layer of the interface, while the unit 19 constitutes the main active element of the logical layer. The logical spatial format and the temporal format of the information exchanged between the equipment comply with the ARINC 629 standard (which, it should be noted, recognizes only the 2 Mbits/s bit rate). However, the process of the invention provides for at least two different bit rates, this involving a different physical format for the messages exchanged, although without modifying the bus access protocol, so as to ensure upward compatibility with the existing systems which conform to the ARINC 629 standard. This process is based on listening to the activity of the bus. This activity is independent of the bit rate as well as of the format (transitions or pulses) of the physical information travelling over the bus. The physical activity of the bus is restored by the converter 17 and then interpreted by the controller 19, thereby enabling the latter to manage the control signals for the general timers for pacing the temporal format of the information (timers referred to by the names TG, ASG/SG, PSG in the ARINC 629 standard) travelling over the bus. The essential characteristics of the process of the invention are as follows.

The bit rate of the information travelling over the bus is a parameter which is programmed in the send part of the equipment, and not in their receive part, except in order to monitor sending.

The frames sent over the bus are made up of wordstrings sent by items of equipment. The succession of wordstrings and the characteristics of each wordstring of one and the same frame are programmable (in a send table XPP, referenced 20 in FIG. 3 and linked to the unit 19) and can include wordstrings at different bit rates depending on the capacities of the corresponding receivers. The information travelling over the bus is organized into "major" frames corresponding to a complete sweep of the send table 20. These major frames are subdivided into "minor" frames each corresponding to a message, that is to say to a programmed cycle for stringing together independent wordstrings each associated with an exchange of elementary information between two or more items of equipment. The unit 19 essentially carries out the following operations:

in a send mode:—selection of the send bit rates for each of the wordstrings within an information message, in a receive mode:

detection of the synchronization bits of the data identification words for the determination of the bit rate of each wordstring acquisition and checking of the data identification words, and of the data themselves at 2 and 8 Mbits/s monitoring of the unit bit rates of each wordstring received and of the validity of each of these wordstrings.

At the sending end, the bit rate is programmed statically. The structure of the various messages is stored in the send table, each message comprising one or more wordstrings, each of these strings relating to one or more specified items of equipment of the same class, this implying that a message may embrace a succession of wordstrings at different bit rates. Of course, the unit 19 must monitor the changes in bit rate from one wordstring to the next (as well as all the other parameters of the information sent), so that a simple fault occurring in the sender is prevented from causing the switch from a bit rate of 8 Mbits/s to one of 2 Mbits/s, the consequence of which would be an increase in the duration of sending of a message and the disturbing of the subsequent sends from the other items of equipment, and hence the modifying of the cycling of the sends.

The determination of the instantaneous bit rate of the send is carried out right from the start of the reception of each wordstring sent: immediately after detecting the message synchronization ("SYNC MSG"), the synchronization pattern ("SYNC LABEL") of the data identifier word of the first wordstring of the message contains the bit rate cue for this wordstring. The synchronization patterns ("SYNC LABEL") of the data identifier words of the consecutive wordstrings contain the bit rate cue for these respective strings. The bit rate of each of the wordstrings is monitored by checking consistency with the static programming carried out in the reception descriptors dedicated to the monitoring of the sends (these descriptors being stored in a receive table RPP linked to the unit 19 and referenced 21 in FIG. 3). To each wordstring sent under the control of the unit 19 there corresponds a single descriptor ("LABEL"). Given that each unit 19 receives, for verification, everything which it sends, it verifies the bit rate of each wordstring sent as and when it is received.

In receive mode, there is no programming of the information bit rate, but dynamic determination of the bit rate of the information received after decoding the synchronization pattern of each data identifier word and checking of consistency of the configuration of the "synchronization pattern" part of each phrase received. For each of the words of a wordstring received, the unit 19 checks the continuity of the bit rate with respect to the value specified by the synchronization pattern. In the case of wordstrings programmed in send and receive mode in an item of equipment, the bit rate static programming cue, produced in the receive table RPP, is used for sending only.

The checking of the activity of the bus consists, for the unit 19, in determining the activity of the reception signals controlled by the converter 17. An inactive bus corresponds, for the unit 19, to the detection of a low level on these signals or to the detection of the absence of pulses, depending on the type of interface used. This check is independent of the bit rate of the information travelling over the bus, thus enabling the same bus access protocol to manage the decision-making regarding the instant of sending of the equipment having different classes of bit rates. The bus can therefore be shared by all these items of equipment under the same conditions.

The send and receive table can be programmed equally well outside the equipment (before installation/set-up) as inside the equipment, in situ (by downloading via the unit 19).

In more detail, the procedure for sending information using the equipment is as follows.

The checking unit 19 reads a specific selection field (a field contained in each wordstring descriptor, see FIG. 4) from the send table 20. The acquisition and interpretation of this field are performed before sending each wordstring of a message, thus allowing selection of the bit rate and of the coding of the wordstring (pattern referenced "SYNC LABEL" in FIG. 4 and constituting the start of each wordstring). The template of this synchronization pattern is specific to the bit rate selected. Thus, in the example of FIG. 4, for the 2 Mbits/s bit rate, this template is a rectangular signal commencing with a logic 1 level lasting 750 ns, followed by a logic 0 level lasting the same length of time, while for the 8 Mbits/s bit rate, this template is a rectangular signal of the same form as the above, but whose two logic levels each last 187.5 ns (see FIG. 4).

The reading of a wordstring descriptor is carried out while sending the template of the inter wordstring gap (or "IWG" in FIG. 4) separating two consecutive wordstrings of a message, or for the first wordstring of a message with the elapsing of the overall temporal event for all the equipment PSG (or SG) at the start of each minor frame.

The unit 19 must be able to send wordstrings in accordance with two basic codings, namely logical coding and physical coding (see FIG. 4), complying with the programming of the bit rate. These two codings can be MPPM coding with pulses of width 62.5 ns and Manchester coding (or alternatively MPPM coding with pulses of width 31.25 ns).

Figure 4:
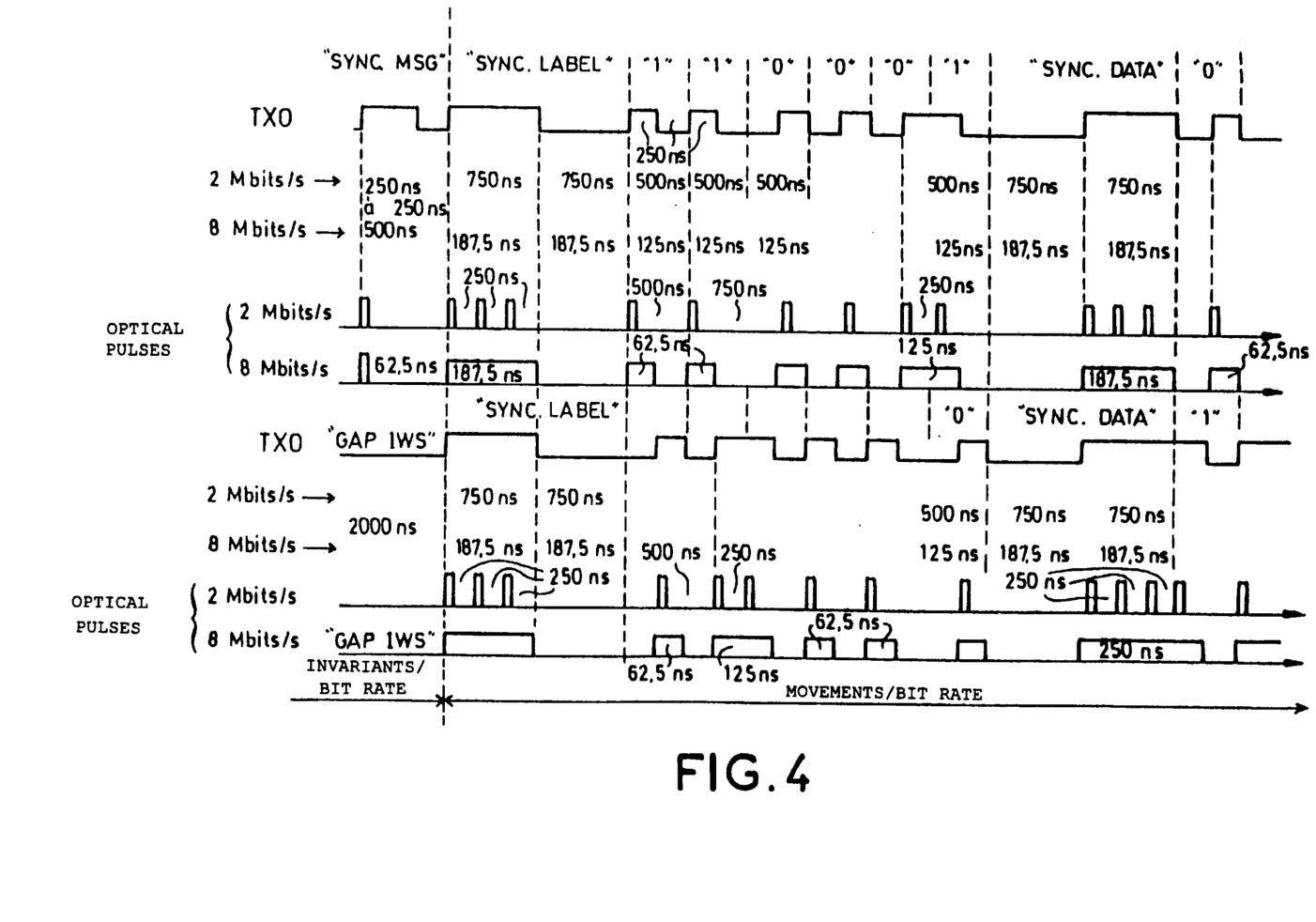
FIG. 4 is a timing diagram relating to information sent in accordance with the process of the invention.

The unit 19 monitors the validity of the bit rate of the information sent by way of its "monitor send" functional units located in the receive channel, which is independent of the send channel. This monitoring consists essentially in identifying the class of the bit rate by recognizing the coding, and in comparing it with the current value of the send bit rate. The bit rate is determined by checking the format of the synchronization patterns of each word reconstructed at the receive end, this word possibly being a data identifier label or a data item. If there is inconsistency between the bit rate sent and that determined at the receiving end, the sending of the message is halted until the next minor frame, that is to say until the next bus cycle.

The spatial format of the logical information (see FIG. 4) generated by the unit 19 and restored by the unit 17 exhibits parts which are independent of the bit rate: message synchronization ("SYNC MSG"), the interwordstring gap ("IWG"), and the end of message for announcing the bus inactive state. This amounts to saying that the variation in the bit rate affects only the actual format of the words contained in the wordstrings, and in no way affects the format of the overall information outside wordstrings.

Figure 5:
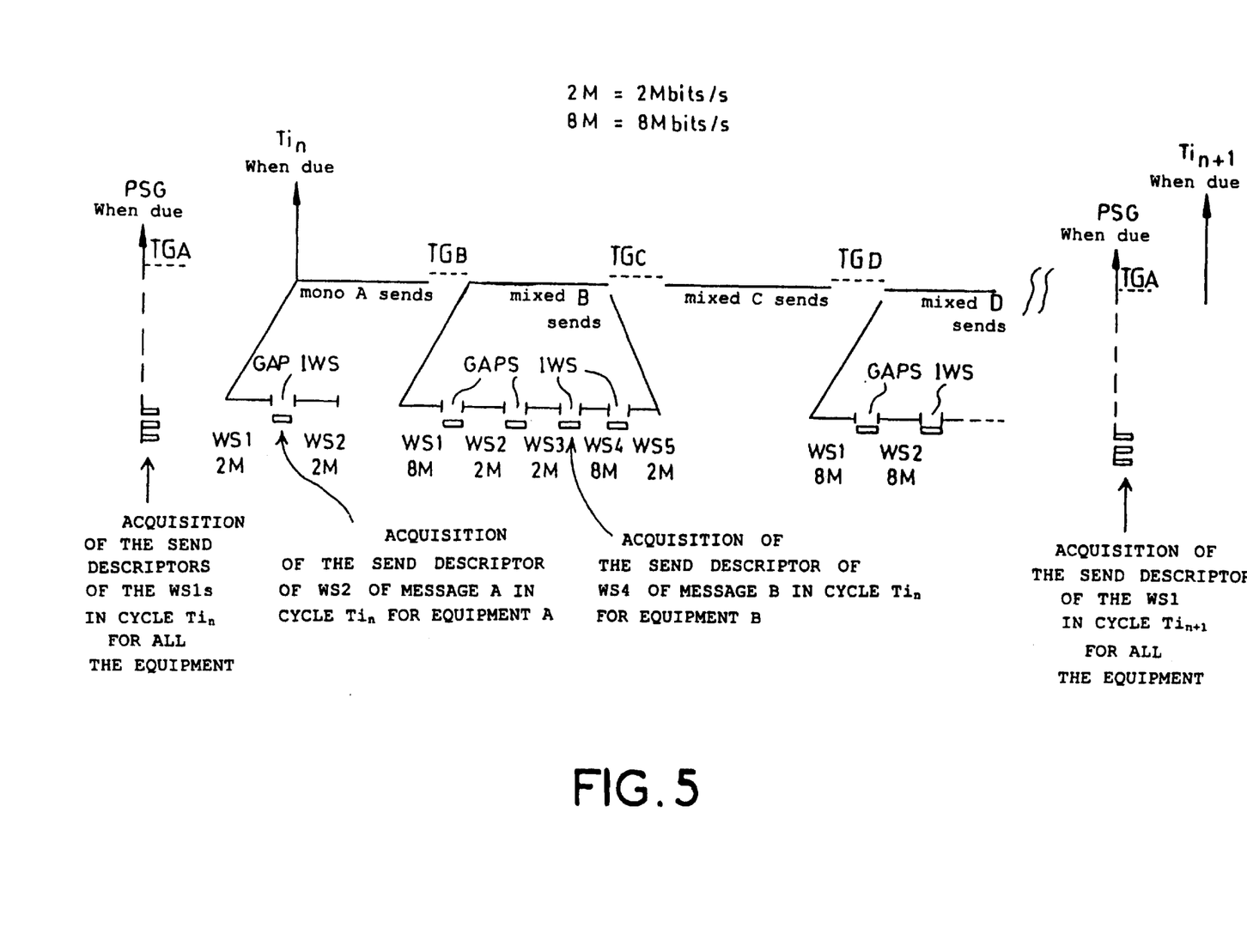
FIG. 5 is a timing diagram relating to information sent in accordance with the process of the invention, representing the activity of several items of equipment.

The temporal format (see FIG. 5) of the information managed by the generic timers ("TI", "TG", "ASG/SG", "PSG") is independent of the variation in bit rate, which means that the cyclicity of the sends as well as the stringing together of the sends for the various items of equipment are not modified. It should be noted that the bit rate is a parameter which relates to each of the wordstrings and not to the message sent (which contains several wordstrings).

At the send end, the class of the converter 17 must be the same as that of the unit 19. The converter 17 uses the TTL information coded at 2 and/or 8 Mbits/s in the form of a TTL signal ("TXOP") and converts it directly into optical information, thereby making it possible to eliminate the resynchronization time and the time for generating electrical pulses, converted into optical pulses, between these two layers, that is to say there is no need to provide an additional item of information of the "coding and bit rate value" type. Thus, the conversion performed by the converter 17 is transparent as regards the bit rate and the coding.

Of course, the characteristics of the optical sender component (a light-emitting diode for example) must be compatible with the characteristics of the optical pulses to be sent (pulse width and distance between pulses). The same is true of the optical receiver component (a PINFET for example).

At the receiving end, the class of the converter 17 must the same as that of the unit 19.

The converter 17 can operate according to one of the following two principles:

- either the receiving part restores the physical information received in the form of TTL signals (signals termed "RXI" and "RXN" in standardized fashion) coded with a Manchester code, irrespective of the coding of the optical physical information received (Manchester or MPPM). To reduce the overall latency time of the reception path, the restoring of the information is made synchronous with the clock of the decoding unit of the unit 19,
- or the receiving part restores the physical information received in the form of a TTL signal (signal "RXOP" according to the standard) whose coding is directly that of the optical physical information received (MPPM or Manchester coding).

Implementing the first principle above entails the requirement to provide, in the converter 17, two functional chains for decoding and monitoring (levels of the signals and their position), and for restoring the physical information in logical form. By contrast, implementation of the second principle requires only the detection of the pulses and their shaping with simplified monitoring (monitoring of the consistency of the levels of the pulses originating from the same sender).

The unit 19 is listening for any bus activity restored by way of the converter 17, which provides the electrical signals RXI and RXN, or by way of the physical signal RXOP. Since the activity of the bus is independent of the information bit rate, any known type of checking unit is capable of determining the activity of the bus and hence of correctly implementing the send protocol described above.

Reception is carried out wordstring by wordstring, adaptation to the two classes of bit rate being carried out phrase by phrase for an item of equipment capable of processing both bit rates.

An item of equipment provided solely for a bit rate of 2 Mbits/s and which receives a wordstring at 8 Mbits/s supplies only the indication of the activity of the bus, but because it does not have the capacity to reconstruct the data identifier word of this wordstring correctly, it produces no reception error indication. The same is true for an item of equipment provided to process solely a bit rate of 8 Mbits/s and which receives a wordstring at 2 Mbits/s.

A wordstring reception error signal is dispatched by the unit 19 to the processor of the relevant item of equipment only if this item of equipment is programmed (in the customization memory 21) to be the destination for this wordstring and only if the data identifier word is correctly decoded by the unit 19.

The decoding unit of the unit 19 comprises two functional chains for restoring logical information. By decoding the template of the synchronization pattern of each data identifier word, the decoding unit determines the current bit rate from the temporal positions of the transitions of the signals RXI, RXN or of the physical signal RXOP which are supplied by the converter 17. Only one of the functional chains must perform correct decoding otherwise the information received cannot be interpreted: this may be due to the fact that either neither of the two chains is active or both are active at the same time.

By virtue of its two functional chains, the encoding unit monitors the quality of the information received. To do this, the decoding unit analyses the position of the transitions or of the pulses with respect to the expected position and also the width of the pulses, these quantities being dependent on the bit rate detected. Any inconsistency discovered in a phrase causes the generation of an error indication.

To obtain the capacity to process two different bit rates, a unit 19 must include the aforesaid units as well as units for monitoring the spatial formats for consistency of the words within a wordstring. Moreover, in respect of the send mode, it must include means for inserting each wordstring at the right bit rate and with the right coding into each message.

Likewise at the receiving end there is no programming of the type of coding or of the bit rate, but dynamic detection of the class of coding and of the class of bit rate from the template of the synchronization pattern at the start of each phrase ("SYNC LABEL") together with confirmation of detection on receipt of each word (data synchronization).

What is claimed is:

1. A communication method between a plurality of apparatuses mutually connected via a bus simultaneously supporting different bit rates,
   wherein a transmitting apparatus performs the steps of:
      determining a bit rate of a wordstring to be transmitted;
      coding the wordstring in accordance with the determined bit rate;
      inserting the coded wordstring in a subframe of a frame of a single time-division multiplexing transmission protocol independently of a data rate of other apparatuses; and
      transmitting the frame to at least one other apparatus using the single time-division multiplexing transmission protocol, and
   wherein a receiving apparatus performs the steps of:
      constantly listening to the bus for data activity;
      receiving transmitted wordstrings when there is data activity on the bus;
      determining the bit rate of each received wordstring; and
      recreating the received wordstrings based on the determined bit rate.

2. The method according to claim 1, wherein the transmitting step transmits the wordstring at the bit rate read in the determining step.

3. The method according to claim 1, wherein the coding step comprises MPPM coding with pulses of 31.25 ns and 62.5 ns.

4. The method according to claim 1, wherein the wordstring is preceded by a synchronous label indicating the bit rate of the wordstring.

5. The method according to claim 4, wherein the receiving apparatus determines the bit rate of the wordstring immediately upon receiving each transmitted wordstring by reading the synchronous label.

6. The method according to claim 1, wherein the transmitting apparatus further performs the step of:
   receiving the frame including the inserted wordstring transmitted in the transmitting step; and
   verifying the inserted wordstring was transmitted at the bit rate read in the determining step.

7. The method according to claim 1, wherein the listening step is performed independent of the bit rate of data activity.

8. The method according to claim 1, wherein the bus comprises an optical bus operating in accordance with a ARINC 629 standard.

9. A communication system between a plurality of apparatuses mutually connected via a bus simultaneously supporting different bit rates,
   wherein a transmitting apparatus comprises:
      means for determining a bit rate of wordstring to be transmitted;
      means for coding the wordstring in accordance with the determined bit rate;
      means for inserting the coded wordstring in a subframe of a frame of a single time-division multiplexing transmission protocol independently of a data rate of other apparatuses;
      means for transmitting the frame to at least one other apparatus using the single time-division multiplexing transmission protocol, and
   wherein a receiving apparatus comprises:
      means for constantly listening to the bus for data activity;
      means for receiving transmitted wordstrings when there is data activity on the bus;
      means for determining the bit rate of each received wordstring; and
      means for recreating the received wordstrings based on the determined bit rate.

10. The system according to claim 9, wherein the transmitting means transmits the wordstring at the bit rate read by the determining means.

11. The system according to claim 9, wherein the coding means comprises MPPM coding with pulses of 31.25 ns and 62.5 ns.

12. The system according to claim 9, wherein the wordstring is preceded by a synchronous label indicating the bit rate of the wordstring.

13. The system according to claim 12, wherein the receiving apparatus determines the bit rate of the wordstring immediately upon receiving each transmitted wordstring by reading the synchronous label.

14. The system according to claim 9, wherein the transmitting apparatus further comprises:
   means for receiving the frame including the inserted wordstring transmitted by the transmitting means; and
   means for verifying the inserted wordstring was transmitted at the bit rate read by the determining means.

15. The system according to claim 9, wherein the listening means is performed independent of the bit rate of data activity.

16. The system according to claim 9, wherein the bus comprises an optical bus operating in accordance with a ARINC 629 standard.

17. A communication method between a plurality of apparatuses mutually connected via a bus simultaneously supporting different bit rates, the improvement comprising:
   determining a respective bit rate for each of a plurality of wordstrings to be transmitted;
   coding the wordstrings in accordance with the respectively determined bit rate;
   inserting the coded wordstrings in a subframe of a frame of a single time-division multiplexing transmission protocol independently of a data rate of other apparatuses; and
   transmitting the frame to at least one other apparatus using the single time-division multiplexing transmission protocol.

18. The method according to claim 17, the improvement further comprising:
   constantly listening to the bus for data activity;
   receiving transmitted wordstrings when there is data activity on the bus;
   determining the bit rate of each of the received wordstrings; and recreating the received wordstrings based on the determined bit rate.

19. The method according to claim 17, wherein the transmitting step transmits the wordstring at the bit rate read in the determining step.

20. The method according to claim 17, wherein the coding step comprises MPPM coding with pulses of 31.25 ns and 62.5 ns.

21. The method according to claim 18, wherein the received wordstring is preceded by a synchronous label indicating the bit rate of the wordstring.

22. The method according to claim 21, wherein the receiving apparatus determines the bit rate of the wordstring immediately upon receiving each transmitted wordstring by reading the synchronous label.

23. The method according to claim 17, wherein the transmitting apparatus further performs the step of:

receiving the frame including the inserted wordstring transmitted in the transmitting step; and verifying the inserted wordstring was transmitted at the bit rate read in the reading step.

24. The method according to claim 18, wherein the listening step is performed independent of the bit rate of data activity.

25. The method according to claim 17, wherein the bus comprises an optical bus operating in accordance with a ARINC 629 standard.

* * * * *